(12) United States Patent
Kameda et al.

(10) Patent No.: US 12,732,040 B2
(45) Date of Patent: Sep. 8, 2026

(54) ROTOR AND DYNAMO-ELECTRIC MACHINE

(71) Applicant: NHK SPRING CO., LTD., Yokohama (JP)

(72) Inventors: Youhei Kameda, Yokohama (JP); Tsuyoshi Matsuda, Yokohama (JP); Yoshikazu Mineda, Yokohama (JP); Soichi Nakayama, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 265 days.

(21) Appl. No.: 18/292,630

(22) PCT Filed: Apr. 22, 2022

(86) PCT No.: PCT/JP2022/018633
§ 371 (c)(1),
(2) Date: Jan. 26, 2024

(87) PCT Pub. No.: WO2023/007888
PCT Pub. Date: Feb. 2, 2023

(65) Prior Publication Data

US 2025/0088052 A1 Mar. 13, 2025

(30) Foreign Application Priority Data

Jul. 28, 2021 (JP) ................................ 2021-123668

(51) Int. Cl.
*H02K 1/28* (2006.01)

(52) U.S. Cl.
CPC ..................................... *H02K 1/28* (2013.01)

(58) Field of Classification Search
CPC ................................ H02K 1/28; H02K 1/278
See application file for complete search history.

(56) References Cited

U.S. PATENT DOCUMENTS 5,427,373 A 6/1995 Kusumoto
2009/0021094 A1* 1/2009 Takimoto .............. H02K 1/278 29/598

(Continued)

FOREIGN PATENT DOCUMENTS

JP H06-23076 A 2/1994
JP 2002-153168 A 5/2002

(Continued)

OTHER PUBLICATIONS

International Search Report and Written Opinion issued in International Application No. PCT/JP2022/018633, dated Jun. 28, 2022.

(Continued)

*Primary Examiner* — Thomas Truong
(74) *Attorney, Agent, or Firm* — Knobbe, Martens, Olson & Bear, LLP

(57) ABSTRACT

This rotor includes a rotor shaft, a permanent magnet held at an outer periphery of the rotor shaft, and a magnet reinforcement tube formed in a cylindrical shape and covering the permanent magnet from an outer peripheral side of the permanent magnet. The magnet reinforcement tube includes plural layers layered in a radial direction, and has plural fiber sheets wound individually for each layer, and each fiber sheet being solidified with resin.

16 Claims, 7 Drawing Sheets

(56) References Cited

U.S. PATENT DOCUMENTS

2016/0130432 A1* 5/2016 Sumii ................ C08F 222/102
525/107
2016/0315514 A1 10/2016 Eckert et al.
2019/0109502 A1 4/2019 Takano et al.
2022/0278584 A1* 9/2022 Høyland ................ H02K 1/278

FOREIGN PATENT DOCUMENTS

JP 2005-312250 A 11/2005
JP 2009-017708 A 1/2009
JP 2015-100202 A 5/2015
JP 2020-005448 A 1/2020

OTHER PUBLICATIONS

Extended European Search Report issued in EP Application No. 22848970.4, dated Oct. 25, 2024.

* cited by examiner

ROTOR AND DYNAMO-ELECTRIC MACHINE

TECHNICAL FIELD

The present disclosure relates to a rotor and a dynamo-electric machine.

BACKGROUND ART

In a magnet fixing method for a permanent magnet dynamo-electric machine described in Japanese Patent Application Laid-Open (JP-A) No. 2005-312250, a permanent magnet is fixed to an outer surface of a rotor shaft by a fixing unit, and then the permanent magnet is press-fitted into a cylindrical binding ring together with the rotor shaft. The entire outer surface of the permanent magnet is covered by the binding ring, and the permanent magnet is fastened and fixed to the rotor shaft. As a result, sufficient fixing strength of the permanent magnet with respect to centrifugal force strength at the time of high-speed rotation is obtained, and it is possible to prevent fragments of the permanent magnet from scattering.

SUMMARY OF INVENTION

Technical Problem

As a method of manufacturing the binding ring (magnet reinforcement tube) as described above, molding by sheet winding is suitable from the viewpoint of cost and a productivity rate. However, in a case in which a thick magnet reinforcement tube is molded by sheet winding, the number of windings of the fiber sheet increases, and the possibility that wrinkles occur in the fiber sheet increases. When wrinkles occur in the fiber sheet, the fiber may be deflected, leading to a decrease in strength.

In consideration of the above fact, an object of the disclosure is to obtain a rotor and a dynamo-electric machine that have a high productivity rate of a magnet reinforcement tube and easily ensure strength.

Solution to Problem

A rotor according to a first aspect includes a rotor shaft, a permanent magnet held at an outer periphery of the rotor shaft, and a magnet reinforcement tube formed in a cylindrical shape and covering the permanent magnet from an outer peripheral side of the permanent magnet. The magnet reinforcement tube includes plural layers layered in a radial direction, and has plural fiber sheets wound individually for each layer, and each fiber sheet being solidified with resin.

In the first aspect, the permanent magnet held at the outer periphery of the rotor shaft is covered from the outer peripheral side of the permanent magnet by a magnet reinforcement tube formed in the cylindrical shape. The magnet reinforcement tube includes plural layers layered in the radial direction, and has plural fiber sheets wound individually for each layer, and each fiber sheet being solidified with resin. Since the magnet reinforcement tube can be manufactured by sheet winding, a productivity rate can be enhanced. In addition, since plural fiber sheets are wound individually for each layer as described above, the number of windings of each fiber sheet is reduced, and possibility that wrinkles occur in the fiber sheet is reduced. As a result, a decrease in strength due to wrinkles is less likely to occur, such that strength of the magnet reinforcement tube can be easily ensured.

In a rotor according to a second aspect, in the first aspect, a circumferential positions of a winding start edges and a circumferential position of a winding end edge of each individual fiber sheets are aligned with each other, and respective circumferential positions of the winding start edges and the winding end edges of plural fiber sheets are aligned with each other.

“Aligned” described in claim 2 may mean that the positions in a circumferential direction are generally the same, and the positions in the circumferential direction do not need to be completely coincident. The same applies to claim 3.

In the second aspect, in the magnet reinforcement tube, the circumferential positions of the winding start edges and the circumferential position of the winding end edges of each individual fiber sheets are aligned with each other, and respective circumferential positions of the winding start edges and the winding end edges of plural fiber sheets are aligned with each other. That is, since the circumferential positions of the winding start edges and the winding end edges of plural fiber sheets are all aligned with each other, for example, production by sheet winding is facilitated.

In a rotor according to a third aspect, in the first aspect, a circumferential positions of a winding start edges and a circumferential position of a winding end edges of each individual fiber sheets are aligned with each other, and respective circumferential positions of the winding start edges and the winding end edges of plural fiber sheets are displaced relative to each other.

In the third aspect, in the magnet reinforcement tube, the circumferential positions of the winding start edges and the circumferential position of the winding end edges of each individual fiber sheets are aligned with each other, but the circumferential positions of the winding start edges and the circumferential position of the winding end edges of plural fiber sheets are displaced relative to each other. As a result, it is possible to disperse discontinuous portions of the fiber sheet in the circumferential direction, making it easier to ensure the strength of the magnet reinforcement tube.

In a rotor according to a fourth aspect, in the third aspect, a number of windings of the fiber sheet included in an innermost layer is larger than a number of windings of the fiber sheets included in other layers.

In the fourth aspect, an innermost layer of the magnet reinforcement tube has high stress when the rotor rotates, but the number of windings of the fiber sheet of the innermost layer is larger than that of the fiber sheets of the other layers. As a result, the discontinuous portion of the fiber sheet between the innermost layer and the layer adjacent thereto can be disposed on the outer periphery side, such that the strength of the magnet reinforcement tube can be more easily ensured.

In a rotor according to a fifth aspect, in the first aspect, a circumferential positions of a winding start edges and a circumferential position of a winding end edges of each individual fiber sheets are displaced relative to each other, and respective circumferential positions of the winding start edges of plural fiber sheets are displaced relative to each other.

In the fifth aspect, in the magnet reinforcement tube, the circumferential positions of the winding start edges and the circumferential position of the winding end edges of each individual fiber sheets are displaced relative to each other, and the circumferential positions of the winding start edges of plural fiber sheets are displaced relative to each other. As a result, it is possible to disperse discontinuous portions of the fiber sheet in the circumferential direction, making it easier to ensure the strength of the magnet reinforcement tube.

In a rotor of a sixth aspect, in any one of the first aspect to the fifth aspect, an innermost layer is formed of a prepreg sheet having higher elasticity, strength, and fiber content than other layers.

In the sixth aspect, in the magnet reinforcement tube, the prepreg sheet having high elasticity, strength, and fiber content is used only in the innermost layer in which stress when the rotor rotates is the highest. As a result, the strength of the magnet reinforcement tube can be ensured at low cost as compared with the case where the prepreg sheet having high elasticity, strength, and fiber content is used for all the layers.

In a rotor of a seventh aspect, in any one of the first aspect to the sixth aspect, a layer formed of a prepreg tape spirally wound around an outer periphery surface of the magnet reinforcement tube is further included.

In the seventh aspect, in the layer formed of the prepreg tape spirally wound around the outer periphery surface of the magnet reinforcement tube, fibers are continuous in the circumferential direction, and the winding start edge and the winding end edge are positioned to be displaced relative to each other in an axial direction. This prepreg tape layer can prevent or suppress peeling of the fiber sheet from an outermost layer.

In a rotor of an eighth aspect, in any one of the first aspect to the sixth aspect, a layer formed of a tow-prepreg spirally wound around an outer periphery surface of the magnet reinforcement tube is further included.

In the eighth aspect, in the layer formed of the tow-prepreg spirally wound around the outer periphery surface of the magnet reinforcement tube, fibers are continuous in the circumferential direction, and the winding start edge and the winding end edge are positioned to be displaced relative to each other in the axial direction. The tow-prepreg layer can prevent or suppress peeling of the fiber sheet from the outermost layer.

A dynamo-electric machine of a ninth aspect includes the rotor according to any one of the first aspect to the eighth aspect, and a stator that generates a rotating magnetic field with respect to the rotor.

In the ninth aspect, the rotor is rotated by the rotating magnetic field generated by the stator. Since this rotor is of any one of the first aspect to the eighth aspect, the above-described effect can be obtained.

Advantageous Effects of Invention

As described above, in the rotor and the dynamo-electric machine according to the disclosure, the productivity rate of the magnet reinforcement tube is high and the strength is easily ensured.

DESCRIPTION OF EMBODIMENTS

First Embodiment

Figure 1:
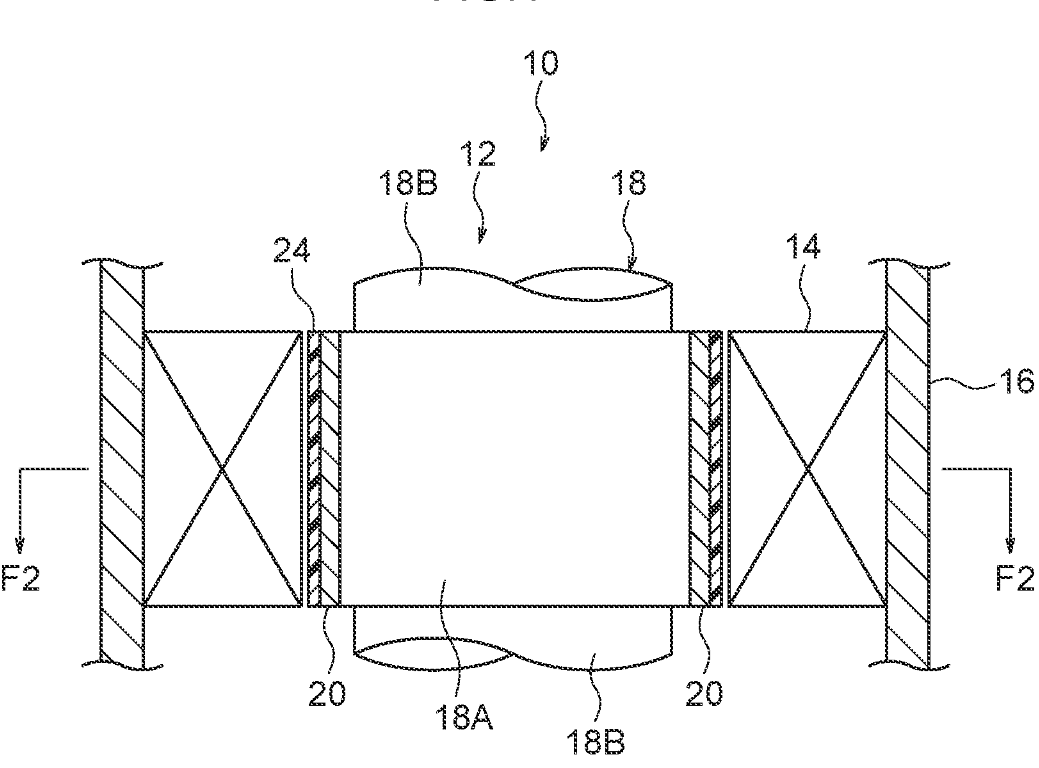
FIG. 1 is a cross-sectional view illustrating a configuration of a main part of a dynamo-electric machine according to a first embodiment.

Hereinafter, a dynamo-electric machine 10 according to a first embodiment of the disclosure will be described with reference to FIGS. 1 to 3. As illustrated in FIG. 1, the dynamo-electric machine 10 according to the present embodiment is a surface permanent magnetic (SPM) motor in which a permanent magnet 20 is held at an outer periphery of a rotor 12. The dynamo-electric machine 10 includes the rotor 12, a stator 14 that generates a rotating magnetic field with respect to the rotor 12, and a case 16 that houses the rotor 12 and the stator 14. In FIG. 1, the stator 14 is schematically illustrated.

Figure 2:
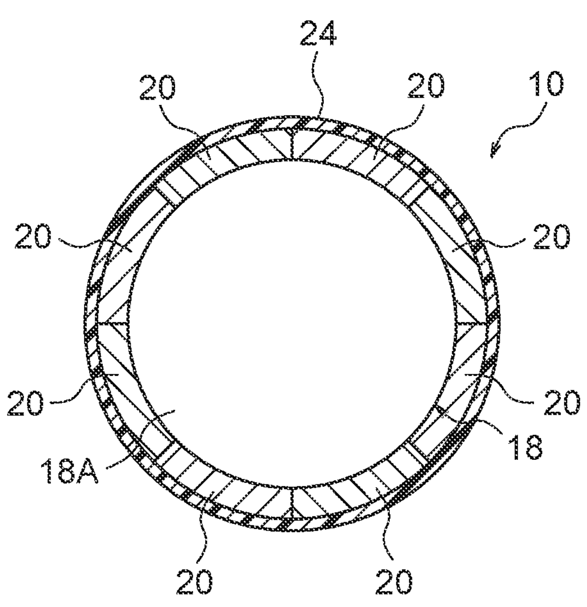
FIG. 2 is a cross-sectional view illustrating a configuration of a rotor according to the first embodiment, and is a view corresponding to a cross section taken along line F2-F2 in FIG. 1.

As illustrated in FIGS. 1 and 2, the rotor 12 includes a rotor shaft 18, plural permanent magnets 20 held at the outer periphery of the rotor shaft 18, and a magnet reinforcement tube 24 covering plural permanent magnets 20 from an outer periphery side. The rotor 12 rotates about an axis of the rotor shaft 18 by the rotating magnetic field generated by the stator 14. The rotor 12 may include one ring-shaped permanent magnet 20 instead of plural permanent magnets 20. In FIGS. 1 and 2, hatching of a cross section of the rotor shaft 18 is omitted in order to make the drawing easy to see.

The rotor shaft 18 has a center portion in an axial direction as a magnet attachment portion 18A. As an example, the magnet attachment portion 18A is formed to have a larger diameter than both axial end portions 18B of the rotor shaft 18. On the outer periphery surface of the magnet attachment portion 18A, plural permanent magnets 20 for configuring magnetic poles are disposed along the circumferential direction of the rotor shaft 18. Plural permanent magnets 20 are fixed to the outer periphery surface of the magnet attachment portion 18A with, for example, an adhesive.

The magnet reinforcement tube 24 is attached to the outer periphery of plural permanent magnets 20. The magnet reinforcement tube 24 is fiber reinforced plastics (FRP) pipe manufactured by solidifying a fiber sheet with resin, and is formed in a cylindrical shape. The magnet reinforcement tube 24 covers the entire outer periphery surfaces of plural permanent magnets 20, and fastens plural permanent magnets 20 to the magnet attachment portion 18A side to firmly fix the permanent magnets to the magnet attachment portion 18A.

The magnet reinforcement tube 24 is manufactured by sheet winding. In the sheet winding, a prepreg sheet obtained by impregnating a fiber sheet with a thermosetting resin as matrix resin and semi-curing the resin is used. In this sheet winding, the prepreg sheet is wound around a mold, thermally cured in a curing furnace, and then the FRP pipe is separated from the mold by a decenter machine. Examples of the fiber sheet include a carbon fiber sheet, a glass fiber sheet, and an aramid fiber sheet. Examples of the thermosetting resin include epoxy resins, phenol resins, and unsaturated polyester resins.

An inner diameter of the magnet reinforcement tube 24 manufactured as described above is formed slightly smaller than an outer diameter of plural permanent magnets 20 fixed to the rotor shaft 18, and the fastening allowance is set. Plural permanent magnets 20 fixed to the rotor shaft 18 are press-fitted into the manufactured magnet reinforcement tube 24. For this press-fitting, for example, a press-fitting device (not illustrated) is used. By this press-fitting, the entire outer periphery surfaces of plural permanent magnets 20 are covered with the magnet reinforcement tube 24, and plural permanent magnets 20 are fastened and firmly fixed to the magnet attachment portion 18A of the rotor shaft 18.

Figure 3:
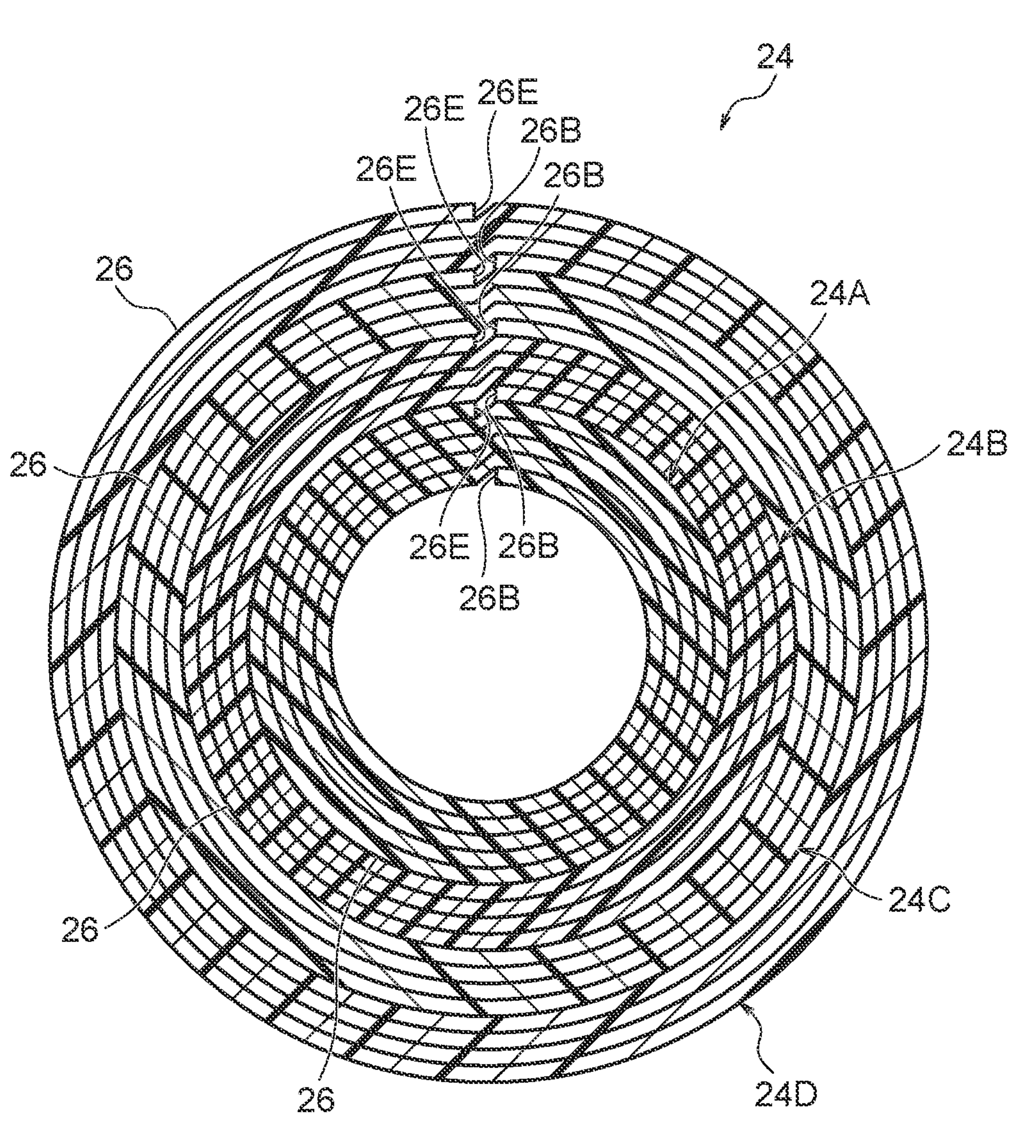
FIG. 3 is a cross-sectional view schematically illustrating a configuration of a magnet reinforcement tube included in the rotor according to the first embodiment.

As illustrated in FIG. 3, the magnet reinforcement tube 24 includes plural (here, four) layers 24A, 24B, 24C, and 24D layered in the radial direction, and has plural fiber sheets 26 wound individually for each layer 24A, 24B, 24C, and 24D, and each fiber sheet 26 is solidified with resin. The number of windings of each fiber sheet 26 is set to, for example, about three to six turns. The winding direction (a clockwise direction in the example illustrated in FIG. 3) of each fiber sheet 26 is opposite to the rotation direction of the rotor 12. In FIG. 3, for convenience of explanation, the radial thickness of the magnet reinforcement tube 24 is illustrated to be large, but actually, the radial thickness of the magnet reinforcement tube 24 is set to be sufficiently smaller than the inner and outer diameters of the magnet reinforcement tube 24.

In the present embodiment, as an example, the circumferential positions of the winding start edges 26B and the winding end edges 26E of the individual fiber sheets 26 are aligned with each other, and the circumferential positions of the winding start edges 26B and the winding end edges 26E of plural fiber sheets 26 are aligned with each other. That is, the circumferential positions of the winding start edges 26B and the winding end edges 26E of plural fiber sheets 26 are all aligned with each other. "Aligned" may mean that the positions in the circumferential direction are generally the same, and the positions in the circumferential direction do not need to be completely coincident.

Operation and Effect

In the dynamo-electric machine 10 having the above configuration, the rotor 12 includes the rotor shaft 18, plural permanent magnets 20 held at the outer periphery of the rotor shaft 18, and the magnet reinforcement tube 24 formed in a cylindrical shape and covering plural permanent magnets 20 from the outer periphery side. Plural permanent magnets 20 are fastened to the rotor shaft 18 side by the magnet reinforcement tube 24, and are firmly fixed to the rotor shaft 18. This provides high mechanical strength. In addition, since the entire outer periphery surfaces of plural permanent magnets 20 are covered by the magnet reinforcement tube 24, the permanent magnet 20 is prevented from being broken by the centrifugal force. Even when the permanent magnet 20 is broken, it is possible to prevent fragments of the permanent magnet 20 from scattering inside the dynamo-electric machine 10.

The above magnet reinforcement tube 24 includes plural layers 24A, 24B, 24C, and 24D layered in the radial direction, has plural fiber sheets 26 wound individually for each of the layers 24A, 24B, 24C, and 24D, and each fiber sheet 26 is solidified with resin. Since the magnet reinforcement tube 24 is manufactured by sheet winding, a productivity rate can be enhanced. Moreover, since plural fiber sheets 26 are wound individually for each of the layers 24A, 24B, 24C, and 24D as described above, the number of windings of each fiber sheet 26 is reduced, and the possibility of wrinkles occurring in the fiber sheet 26 is reduced. As a result, a decrease in strength due to wrinkles is less likely to occur, such that the strength of the magnet reinforcement tube 24 can be easily ensured.

In the present embodiment, in the magnet reinforcement tube 24, the circumferential positions of the winding start edges 26B and the winding end edges 26E of the individual fiber sheets 26 are aligned with each other, and the circumferential positions of the winding start edges 26B and the winding end edges 26E of plural fiber sheets 26 are aligned with each other. That is, since the circumferential positions of the winding start edges 26B and the winding end edges 26E of plural fiber sheets 26 are all aligned with each other, for example, the production of sheet winding is facilitated.

Next, another embodiment of the disclosure will be described. Configurations and operations basically similar to those of the described embodiment are denoted by the same reference numerals as those of the described embodiment, and description thereof will be omitted.

Second Embodiment

Figure 4:
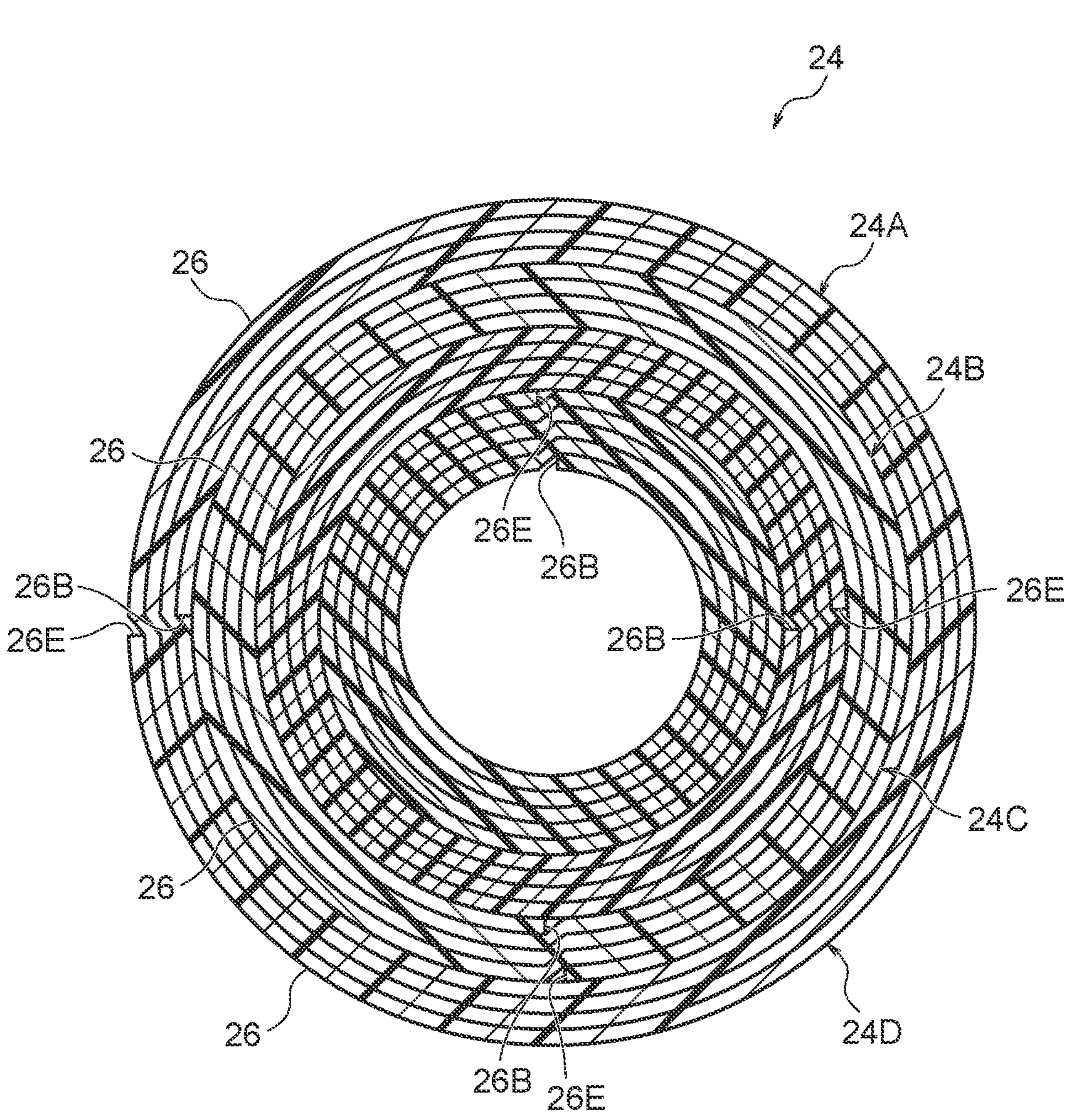
FIG. 4 is a cross-sectional view schematically illustrating a configuration of a magnet reinforcement tube included in a rotor according to a second embodiment.

FIG. 4 is a schematic cross-sectional view illustrating a configuration of a magnet reinforcement tube 24 included in a rotor according to a second embodiment of the disclosure. In the magnet reinforcement tube 24 according to the second embodiment, circumferential positions of winding start edges 26B and winding end edges 26E of individual fiber sheets 26 are aligned with each other, but circumferential positions of winding start edges 26B and winding end edges 26E of plural (here, four) fiber sheets 26 are displaced relative to each other at equal angles. In this embodiment, as an example, the circumferential positions of the winding start edges 26B and the winding end edges 26E of plural fiber sheets 26 are displaced relative to each other at substantially equal angles (here, about 90 degrees). In this embodiment, since the configuration other than the above is similar to that of the first embodiment, basically similar operations and effects to those of the first embodiment can be obtained. Moreover, in this embodiment, since the winding start edge 26B and the winding end edge 26E, which are discontinuous portions of the fiber sheet 26, can be dispersed in the circumferential direction, the strength of the magnet reinforcement tube 24 can be more easily ensured.

Third Embodiment

Figure 5:
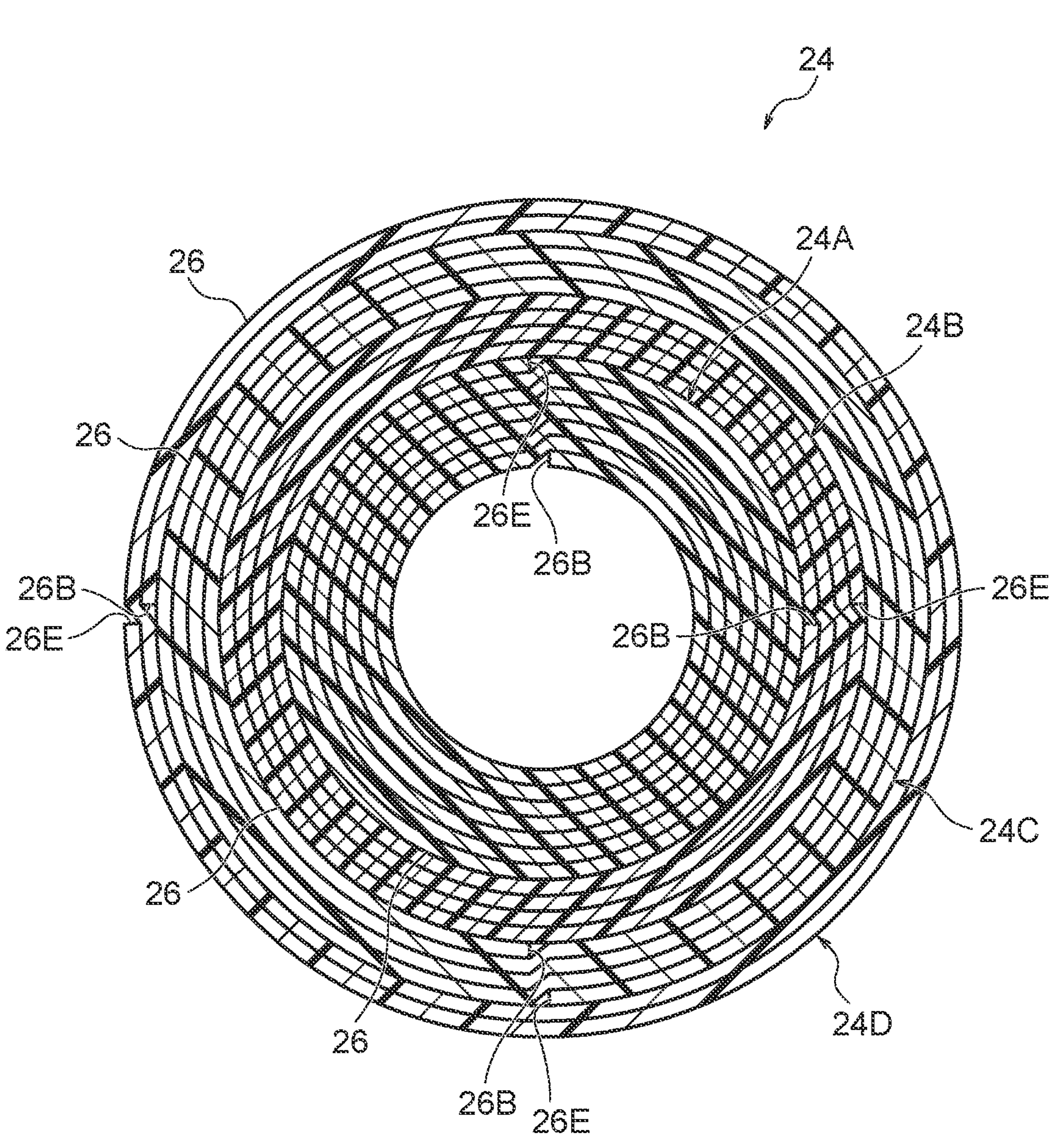
FIG. 5 is a cross-sectional view schematically illustrating a configuration of a magnet reinforcement tube included in a rotor according to a third embodiment.

FIG. 5 is a schematic cross-sectional view illustrating a configuration of a magnet reinforcement tube 24 included in a rotor according to a third embodiment of the disclosure. In the magnet reinforcement tube 24 according to the third embodiment, circumferential positions of a winding start edge 26B and a winding end edge 26E of each fiber sheet 26 are set in the same manner as in the magnet reinforcement tube 24 according to the second embodiment. However, the number of windings of the fiber sheet 26 included in an innermost layer 26A is set to be larger than the number of windings of the fiber sheets 26 included in the other layers 24B, 24C, and 24D. In this embodiment, since the configuration other than the above is similar to that of the second embodiment, basically similar operations and effects to those of the second embodiment can be obtained. Moreover, by setting the number of windings of the fiber sheet 26 included in the innermost layer 26A to be large, the discontinuous portion of the fiber sheet 26 between the innermost layer 26A and a layer 26B adjacent to the innermost layer 26A can be disposed on the outer periphery side, such that the strength of the magnet reinforcement tube 24 can be more easily ensured. In the present embodiment, as in the first embodiment, the circumferential positions of the winding start edge 26B and the winding end edge 26E of each fiber sheet 26 may be aligned with each other.

Fourth Embodiment

Figure 6:
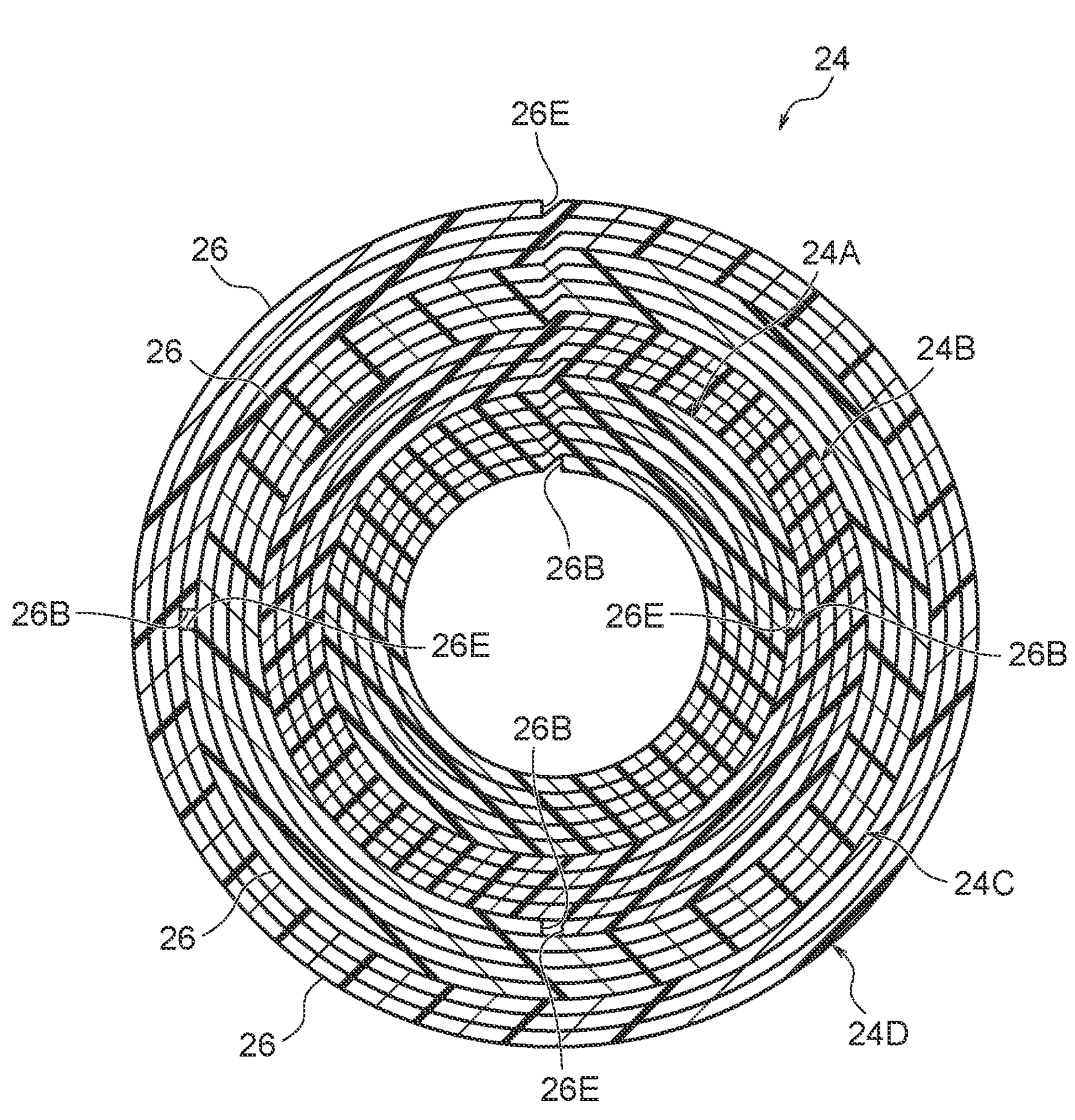
FIG. 6 is a cross-sectional view schematically illustrating a configuration of a magnet reinforcement tube included in a rotor according to a fourth embodiment.

FIG. 6 is a schematic cross-sectional view illustrating a configuration of a magnet reinforcement tube 24 included in a rotor according to a fourth embodiment of the disclosure. In the magnet reinforcement tube 24 according to the fourth embodiment, circumferential positions of winding start edges 26B and winding end edges 26E of individual fiber sheets 26 are displaced relative to each other, and circumferential positions of winding start edges 26B of plural fiber sheets 26 are displaced relative to each other at equal angles. In this embodiment, as an example, the circumferential positions of the winding start edges 26B of plural fiber sheets 26 are displaced relative to each other at substantially equal angles (here, about 90 degrees). In this embodiment, since the configuration other than the above is similar to that of the first embodiment, basically similar operations and effects to those of the first embodiment can be obtained. Moreover, in this embodiment, since the winding start edge 26B and the winding end edge 26E, which are discontinuous portions of the fiber sheet 26, can be dispersed in the circumferential direction, the strength of the magnet reinforcement tube 24 can be more easily ensured.

Fifth Embodiment

Figure 7:
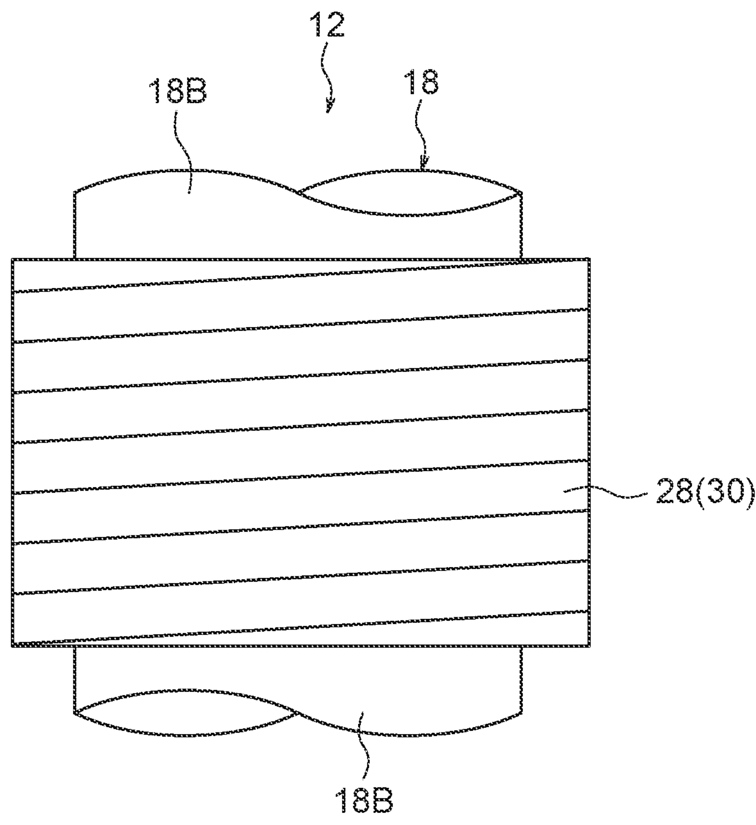
FIG. 7 is a side view illustrating a configuration of a rotor according to a fifth embodiment.

FIG. 7 is a side view illustrating a configuration of a rotor 12 according to a fifth embodiment of the disclosure. The rotor 12 according to the fifth embodiment has a configuration in which a layer of a prepreg tape 28 is added to the rotor 12 according to any one of the first to fourth embodiments. The layer of the prepreg tape 28 is a layer formed of the prepreg tape 28 spirally wound around the outer periphery surface of the magnet reinforcement tube 24. In this embodiment, since the configuration other than the above is similar to that of any one of the above embodiments, basically similar operations and effects as those of any one of the above embodiments can be obtained. Moreover, in the layer of the prepreg tape 28, fibers are continuous in the circumferential direction, and a winding start edge and a winding end edge (not illustrated) are positioned to be shifted in the axial direction of the rotor 12. This layer of the prepreg tape 28 can prevent or suppress peeling of the fiber sheet 26 from the outermost layer.

In the fifth embodiment, a layer formed of a tow-prepreg 30 may be provided instead of the layer of the prepreg tape 28. Since the layer formed of the tow-prepreg 30 is a layer formed of the tow-prepreg 30 spirally wound around the outer periphery surface of the magnet reinforcement tube 24, it is possible to prevent or suppress peeling of the fiber sheet 26 from the outermost layer as in the fifth embodiment.

Sixth Embodiment

Figure 8:
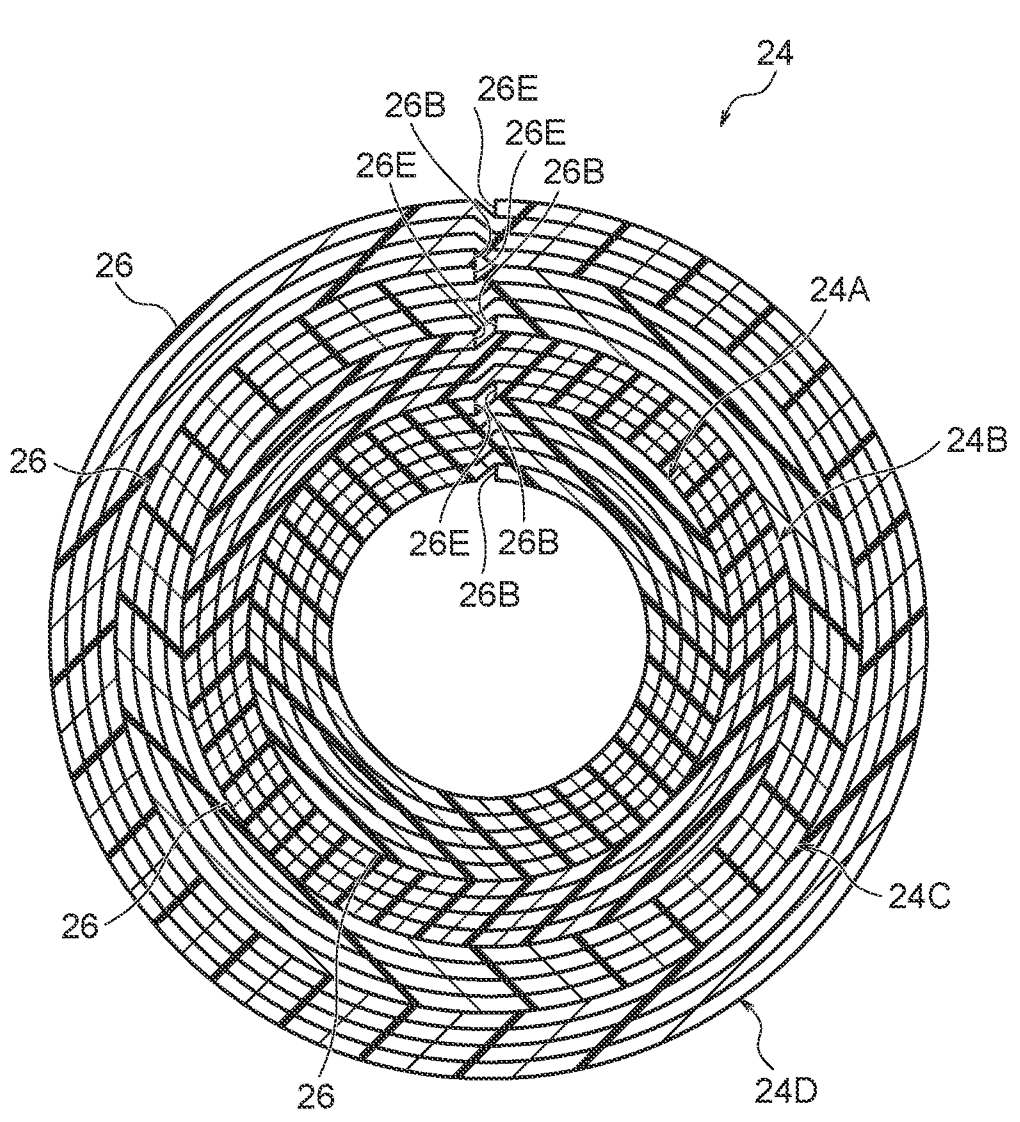
FIG. 8 is a cross-sectional view schematically illustrating a configuration of a magnet reinforcement tube included in a rotor according to a sixth embodiment.

FIG. 8 is a schematic cross-sectional view illustrating a configuration of a magnet reinforcement tube 24 included in a rotor 12 according to a sixth embodiment of the disclosure. In the magnet reinforcement tube 24 according to the sixth embodiment, plural fiber sheets 26 include sheets with opposite winding direction. Specifically, in the outermost layer 24D, the winding direction of the fiber sheet 26 is a counterclockwise direction in FIG. 8, and the rotation direction of the rotor 12 is a clockwise direction in FIG. 8. In this embodiment, since the configuration other than the above is similar to that of the first embodiment, basically similar operations and effects to those of the first embodiment can be obtained. Moreover, since the winding direction of the fiber sheet 26 of the outermost layer 24D is set to be opposite to the rotation direction of the rotor 12, it is possible to prevent or suppress peeling of the outermost fiber sheet 26 due to air resistance when the rotor 12 rotates.

In the magnet reinforcement tube 24 of each of the above embodiments, the prepreg sheet having high elasticity, strength, and fiber content may be used only in the innermost layer 24A in which the stress when the rotor 12 rotates is the highest. As a result, the strength of the magnet reinforcement tube 24 can be ensured at low cost as compared with the case where the prepreg sheet having high elasticity, strength, and fiber content is used for all the layers 24A, 24B, 24C, and 24D.

In each of the above embodiments, the number of windings of the fiber sheet 26 of each of the layers 24A, 24B, 24C, and 24D is set to about three to six, but the disclosure is not limited thereto, and the number of windings of each fiber sheet 26 can be appropriately changed.

In addition, the disclosure can be variously modified without departing from the gist thereof. It is needless to say that the scope of rights of the disclosure is not limited to the above embodiments.

The disclosure of Japanese Patent Application No. 2021-123668 filed on Jul. 28, 2021 is incorporated herein by reference in their entirety. All documents, patent applications, and technical standards described in this specification are incorporated herein by reference to the same extent as if each document, patent application, and technical standard were specifically and individually indicated to be incorporated by reference.

What is claimed is:

1. A rotor, comprising:

a rotor shaft;

a permanent magnet held at an outer periphery of the rotor shaft; and a magnet reinforcement tube formed in a cylindrical shape and covering the permanent magnet from an outer peripheral side of the permanent magnet, wherein the magnet reinforcement tube comprises a plurality of layers layered in a radial direction, and has a plurality of fiber sheets wound individually for each layer, each fiber sheet being solidified with resin, wherein a circumferential position of a winding start edge and a circumferential position of a winding end edge of each individual fiber sheet are aligned with each other, and wherein respective circumferential positions of the winding start edges and the winding end edges of the plurality of fiber sheets are aligned with each other.

2. The rotor according to claim 1, wherein an innermost layer is formed of a prepreg sheet having higher elasticity, strength, and fiber content than other layers.

3. The rotor according to claim 1, further comprising a layer formed of a prepreg tape, spirally wound around an outer periphery surface of the magnet reinforcement tube.

4. The rotor according to claim 1, further comprising a layer formed of a tow-prepreg, spirally wound around an outer periphery surface of the magnet reinforcement tube.

5. A dynamo-electric machine, comprising:

the rotor according to claim 1; and a stator that generates a rotating magnetic field with respect to the rotor.

6. A rotor comprising:

a rotor shaft;

a permanent magnet held at an outer periphery of the rotor shaft; and a magnet reinforcement tube formed in a cylindrical shape and covering the permanent magnet from an outer peripheral side of the permanent magnet, wherein the magnet reinforcement tube comprises a plurality of layers layered in a radial direction, and has a plurality of fiber sheets wound individually for each layer, each fiber sheet being solidified with resin, wherein a circumferential position of a winding start edge and a circumferential position of a winding end edge of each individual fiber sheet are aligned with each other, and wherein respective circumferential positions of the winding start edges and the winding end edges of the plurality of fiber sheets are displaced relative to each other.

7. The rotor according to claim 6, wherein a number of windings of the fiber sheet included in an innermost layer is larger than a number of windings of the fiber sheets included in other layers.

8. The rotor according to claim 6, wherein an innermost layer is formed of a prepreg sheet having higher elasticity, strength, and fiber content than other layers.

9. The rotor according to claim 6, further comprising a layer formed of a prepreg tape, spirally wound around an outer periphery surface of the magnet reinforcement tube.

10. The rotor according to claim 6, further comprising a layer formed of a tow-prepreg, spirally wound around an outer periphery surface of the magnet reinforcement tube.

11. A dynamo-electric machine, comprising:

the rotor according to claim 6; and a stator that generates a rotating magnetic field with respect to the rotor.

12. A rotor comprising:

a rotor shaft;

a permanent magnet held at an outer periphery of the rotor shaft; and a magnet reinforcement tube formed in a cylindrical shape and covering the permanent magnet from an outer peripheral side of the permanent magnet, wherein the magnet reinforcement tube comprises a plurality of layers layered in a radial direction, and has a plurality of fiber sheets wound individually for each layer, each fiber sheet being solidified with resin, wherein a circumferential position of a winding start edge and a circumferential position of a winding end edge of each individual fiber sheet are displaced relative to each other, and wherein respective circumferential positions of the winding start edges of the plurality of fiber sheets are displaced relative to each other.

13. The rotor according to claim 12, wherein an innermost layer is formed of a prepreg sheet having higher elasticity, strength, and fiber content than other layers.

14. The rotor according to claim 12, further comprising a layer formed of a prepreg tape, spirally wound around an outer periphery surface of the magnet reinforcement tube.

15. The rotor according to claim 12, further comprising a layer formed of a tow-prepreg, spirally wound around an outer periphery surface of the magnet reinforcement tube.

16. A dynamo-electric machine, comprising:

the rotor according to claim 12; and a stator that generates a rotating magnetic field with respect to the rotor.

* * * * *